(No Model.)
C. A. MILLER.
ROAD CART.
No. 387,311. Patented Aug. 7, 1888.
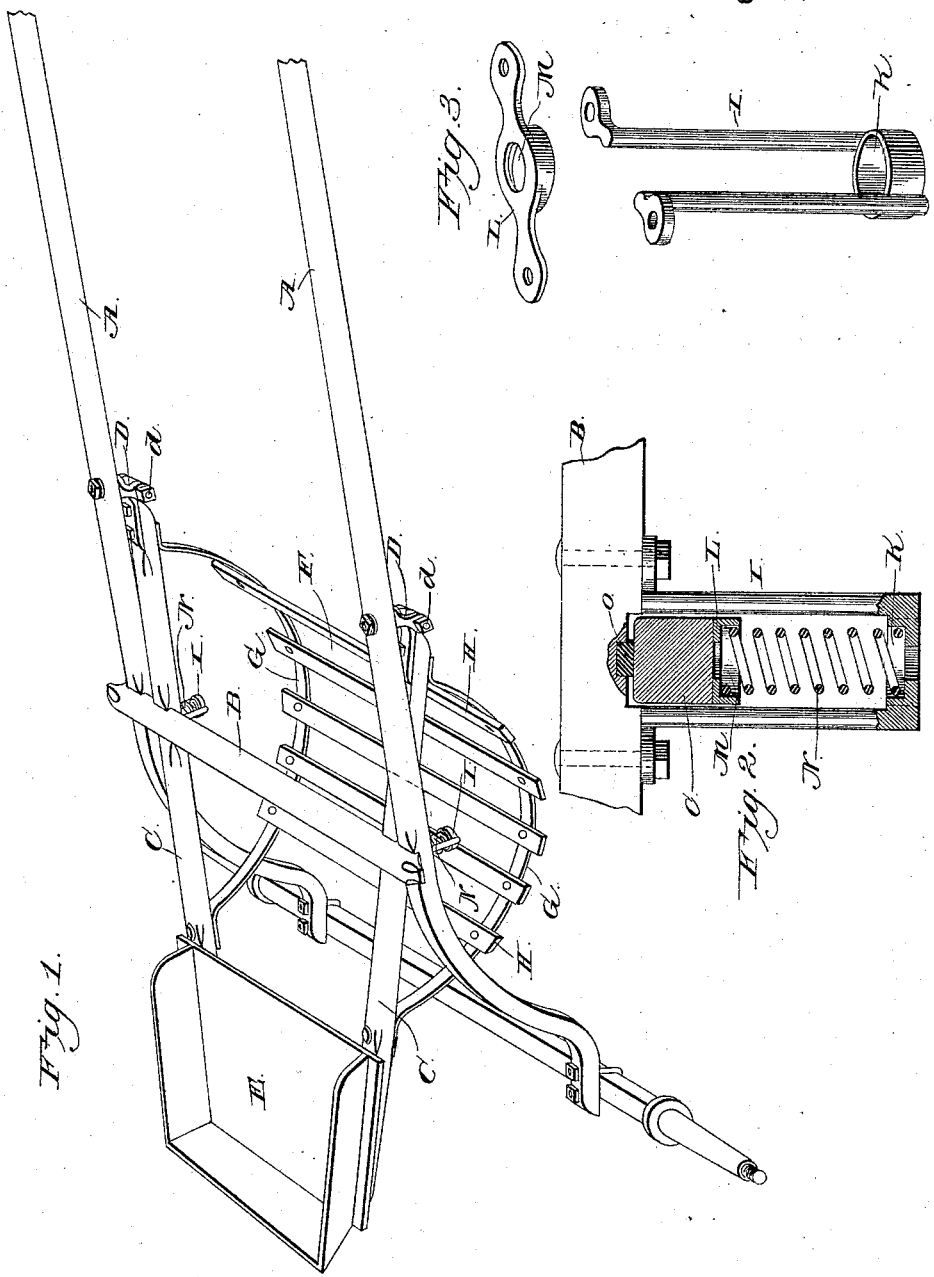

UNITED STATES PATENT OFFICE.

CARMI A. MILLER, OF SPRING VALLEY, ILLINOIS.

ROAD-CART.

SPECIFICATION forming part of Letters Patent No. 387,311, dated August 7, 1888.

Application filed February 29, 1888. Serial No. 265,670. (No model.)

*To all whom it may concern:*

Be it known that I, CARMI A. MILLER, a citizen of the United States, residing at Spring Valley, in the county of Bureau and State of Illinois, have invented new and useful Improvements in Road-Carts, of which the following is a specification.

My invention relates to improvements in road-carts; and it has for its object to provide a spring for the seat which is resilient and is at the same time so arranged as to be capable of resisting the strain incident to violent jolts of the vehicle.

With these objects in view the invention consists in a certain novel construction and arrangement of devices, fully set forth hereinafter in connection with the accompanying drawings, wherein—

Figure 1 is a perspective view of a road-cart provided with the improvements, the wheels being removed. Fig. 2 is a transverse section on the line $x\,x$ of Fig. 1. Fig. 3 is a detail view of the loop which is attached to the lower side of the cross-bar.

Referring by letter to the drawings, A A designate the thills, which are connected at their rear ends to the axle in the ordinary manner, and B designates the cross-bar which connects the thills at their rear ends.

C C designate the side bars of the seat, which are mounted at their front ends on the cross-bolts $d\,d$ of the shackles D D, which are attached to the under sides of the thills a short distance in front of the cross bar B. These side bars pass under the cross-bar between the thills, and therefore converge and incline upward toward their rear ends.

E designates the seat, which is secured to the rear ends of the side bars, and F designates the foot-rest, which depends from the same in front of the said seat. In the said foot-rest, G G represent the curved straps, which are attached to the under sides of the side bars, and H H represent the slats, which are secured at their ends to the said straps.

To support the rear ends of the side bars, and therefore the seat which is attached thereto, I provide the following means: I designates a depending loop, which is secured to the cross-bar and embraces the side bar, and it is provided at its lower end with the socket K. A socket-plate, L, is secured to the under side of the side bar, and is provided at its center with the socket M, the said socket being directly over the socket in the lower end of the loop. A coiled spring, N, is seated at its upper and lower ends, respectively, in the sockets K and M, and it will be readily seen that the effect of the said spring will be to normally hold the side bar pressed against the lower side of the cross-bar. (It will be understood that this spring device is duplicated on the other side of the vehicle.)

The under side of the cross-bar within the loops which are attached thereto is slightly recessed or provided with depressions, and in the said depressions are arranged the elastic cushions O O, of rubber or other suitable material, which will receive the impact of the side bars when forced by the strength of the springs.

It will be seen that the side bars are guided in their vertical motion by the sides of the loops, and thus all lateral strain is prevented.

Various changes may be made in the details of construction of this device without departing from the spirit of the invention, and I reserve the right to make such changes. For instance, the front ends of the side bars, instead of being mounted under the thills, may be mounted on the sides thereof, and the lower end of the loop may, instead of being provided with a socket, be provided with a stud, over which the lower end of the spring is fitted.

Having thus described my invention, I claim—

1. The combination of the side bars mounted at their front ends on the thills, the depending loops I, embracing and guiding the said side bars, and the extensile springs N, mounted in the loops and bearing against the under sides of the side bars, substantially as specified.

2. The combination, with the thills and the cross-bar B, of the side bars mounted on or pivoted to the thills, the loops depending from the cross-bar and having sockets in their lower ends, the plates attached to the under sides of the side bars and having sockets therein, and the coiled springs seated at their ends, respectively, in the said sockets, substantially as specified.

3. The combination, with the thills and the cross-bar B, of the side bars mounted at their front ends in shackles depending from the thills, the loops I I, depending from the cross-bar and having sockets in their lower ends, the socket-plates attached to the under sides of the said bars, the springs mounted at their ends in the said sockets, and the elastic cushions on the under side of the cross-bar within the loops I, substantially as and for the purpose specified.

In testimony that I claim the foregoing as my own I have hereto affixed my signature in presence of two witnesses.

CARMI A. MILLER.

Witnesses:
M. BARTON,
M. E. FINAN.